Figure 1:
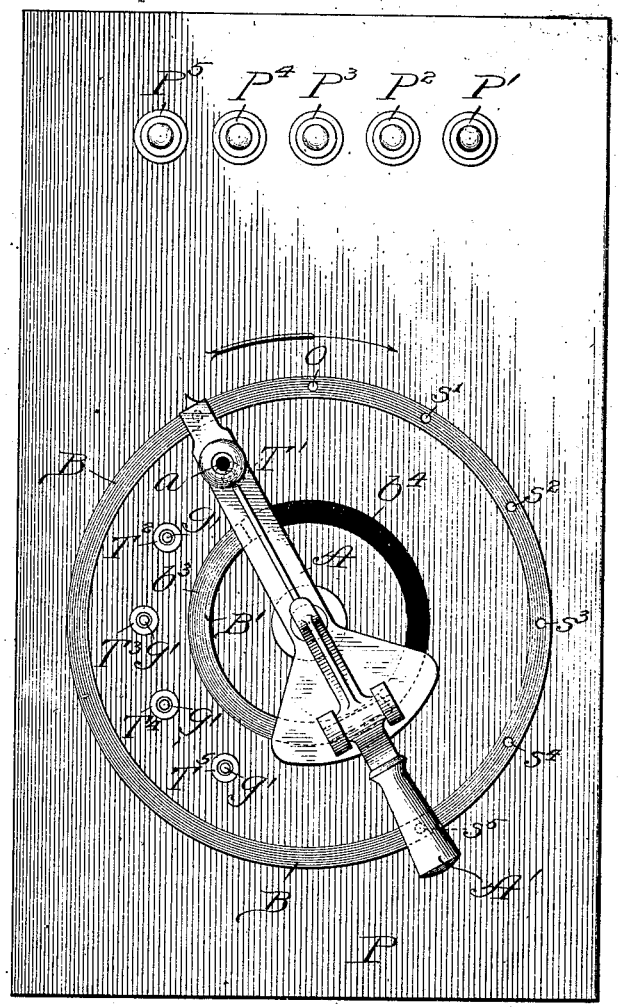

No. 828,518. PATENTED AUG. 14, 1906.
C. E. SCRIBNER.
SIGNALING SYSTEM FOR ELECTRIC RAILWAYS.
APPLICATION FILED DEC. 1, 1905.

3 SHEETS—SHEET 1.

Witnesses:
Geo. D. Davison
G. E. Falk.

Inventor:
Charles E. Scribner,
By Barton & Barton
Attys.

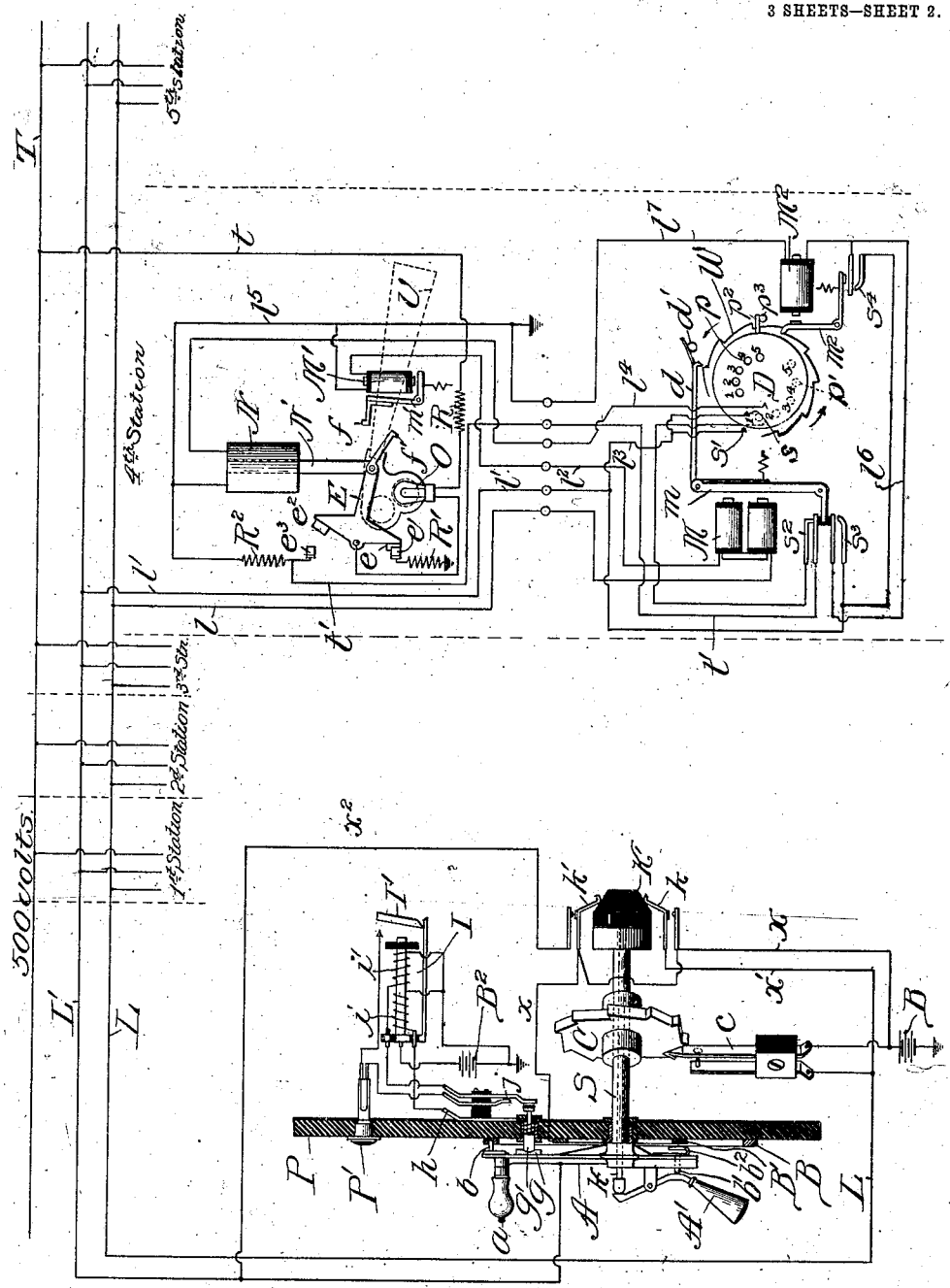

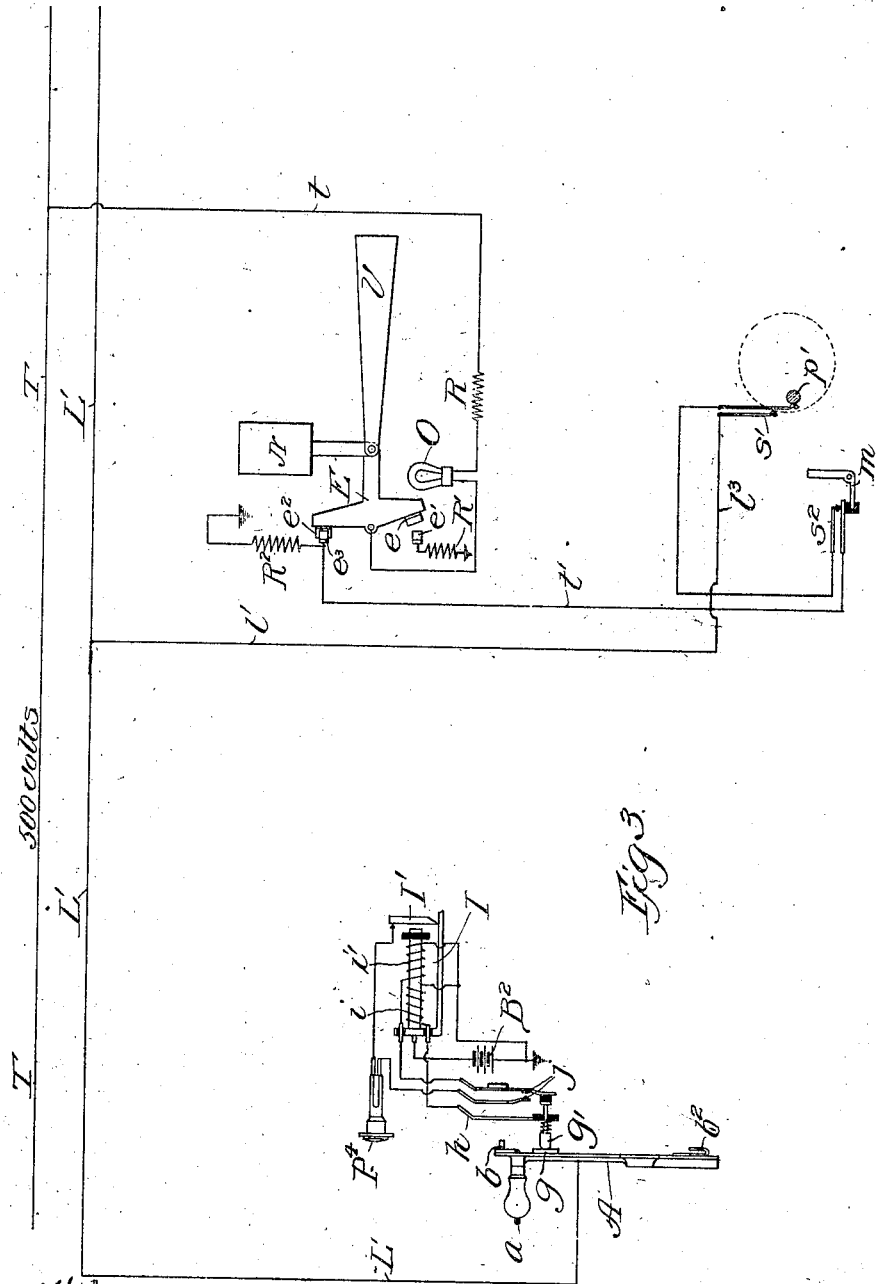

UNITED STATES PATENT OFFICE.

CHARLES E. SCRIBNER, OF JERICHO, VERMONT, ASSIGNOR TO WESTERN ELECTRIC COMPANY, OF CHICAGO, ILLINOIS, A CORPORATION OF ILLINOIS.

SIGNALING SYSTEM FOR ELECTRIC RAILWAYS.

No. 828,518.   Specification of Letters Patent.   Patented Aug. 14, 1906.

Application filed December 1, 1905. Serial No. 289,724.

*To all whom it may concern:*

Be it known that I, CHARLES E. SCRIBNER, a citizen of the United States, residing at Jericho, in the county of Chittenden and State of Vermont, have invented a certain new and useful Improvement in Signaling Systems for Electric Railways, of which the following is a full, clear, concise, and exact description.
My invention relates to a railway signaling system, and more especially to means for testing the selective operation of a plurality of signals.

In the operation of a signaling system where a number of signals are controlled from a central station by a single piece of apparatus coöperating with apparatus at each substation it is desirous to have a test-circuit such that the operator at the central office may test the movements of the signaling apparatus at the various substations to determine whether it has operated correctly and whether a particular signal has moved into the desired position—as, for example, the danger position.

Heretofore in systems of this kind it has been usual to employ separate testing and signal-setting devices. In my invention, however, both the signal-setting positions and the testing positions are placed on the same device in such relation to each other that a partial movement of the central-station device will give the positions for closing the signal-setting circuit and a subsequent continued movement will give the position for closing the testing-circuit. Heretofore in systems of this kind employing a device at the central station for sending impulses of current over the line to operate step-by-step
40 mechanisms at each signaling-station it has been assumed that the apparatus would work synchronously and that for a certain number of impulses sent over the line from the central station the step-by-step mechanisms at
45 each signaling-station would advance a corresponding number of steps. If the apparatus could be made to operate in perfect step, this would be true, and it would be possible to provide a test-circuit connection which would be made through a definite number of steps forward after the setting of a signal.

By way of illustration suppose we have five stations on a line and our substation devices are put into operative condition to set a signal by advancing one step for station No. 1, two steps for station No. 2, &c., up to five steps for station No. 5. Let us first consider an arrangement in which to get the test connections. We continue on and advance one step for station No. 1, two steps for station No. 2. &c., up to five steps for station No. 5 in a similar order. Let us assume in using the above arrangement that it is desired to send four impulses over the line. Let us further suppose that through a slip in the mechanism the step-by-step devices at the signaling-stations advance only three steps. We therefore in reality set the signal of station No. 3 instead of the No. 4 signal. If we now advance to the testing position, stepping up four steps, the devices at the signaling-stations would land on the step which would give the test-circuit connection for station No. 3. Under such conditions the central-station apparatus points to station No. 4 and can receive current from the No. 3 testing-circuit, and hence it will be possible to operate the testing-signal for No. 4 station and get a false test-signal. I have found in practice that the step-by-step mechanisms are subject to such faults and are liable to miss a step and get out of synchronism. In order to avoid this false test-signal, I have invented a new arrangement of the test positions in relation to the positions for setting the signal.

In my arrangement I place the steps for advancing to a position for setting the signal at a selected station in the usual way—that is, one step for station No. 1, two steps for station No. 2, &c., up to five steps for station No. 5. I then arrange the test positions in a backward notation, following on the signal-setting positions, so that I advance one step for test of station No. 5, two steps for test of station No. 4, &c., up to five steps for test of station No. 1. It will thus be seen that any false move like the one outlined above will cause the central-station apparatus to point to station No. 4, while the step-by-step device at the signaling-stations will land on test step for station No. 5. Not having yet arrived at the position for station No. 3, the only one at which the signal is set and from which current can be received at the central station, there will be no test-current on the central-office apparatus, and hence no test-signal can be received.

My invention will be more readily understood by reference to the accompanying drawings, in which—

Figure 1 is a front view of the face of a central-station selecting apparatus, showing the arrangement of setting and testing positions. Fig. 2 is a diagrammatic view of a system in which my invention is applied, illustrating the circuits between the apparatus at the operator's office and the apparatus controlled thereby at one of the substations. Fig. 3 is a diagram of the test-circuit.

Like parts are indicated by similar reference-letters throughout the different views.

In this system, which is the subject of a copending application to Frank R. McBerty, there is a central station connected by two limbs or conductors L L' with a plurality of signaling-stations. At the central station is a selector and current-sending device provided with a testing-circuit and lamp. At each signaling-station is a selecting device and signal-setting mechanism.

The plate P, of insulating material, such as slate, forms the mounting for the device at the operator's station. A shaft S, carrying a toothed wheel C, is rotatably mounted in said plate. A pair of switch-springs $c$ are arranged to be operated by the teeth of the wheel C. Secured to the front end of the shaft S is an arm A, adapted to travel over the face of an annular plate B on the front of the plate P. In the right-hand portion of the plate B are a series of holes S' $S^2$ $S^3$, &c., which are arranged so that they may be engaged by a pin $b$ as the arm A is revolved. These holes are numbered consecutively to correspond to the several signal-stations on the line.

A lug $g$ is secured on the under side of the arm A, so as to pass over a series of plunger-buttons $g'$ when the arm is rotated and force them momentarily down to break the contact $j$. A terminal $h$ is connected to each button $g'$. The buttons $g'$, as shown in Fig. 1, are located at testing positions $T^5$ $T^4$ $T^3$, &c., arranged in reverse notation from that of the holes S' $S^2$ $S^3$, &c. It will be seen, therefore, that while the first hole S' reached by the rotation of the arm A is the setting position for station No. 1 the first test-button $T^5$ reached by said arm is the testing position for station No. 5 and that, as shown in Fig. 1, before reaching the testing position for station No. 1 the testing positions for all the other stations must be passed.

P' $P^2$ $P^3$, &c., are test-lamps for stations 1 2 3, &c., respectively, which when lighted indicate that a signal has been set at the corresponding station.

The signal-setting positions S', &c., and the testing positions T', &c., are so arranged with relation to each other and the teeth upon the ratchet-wheel C that when the arm A is held over any one of said signal-setting positions the contact-springs $c$ are closed; but when said arm is over the testing positions said contact-springs are in their open position.

The operation of the system will be as follows: Suppose it is desired to set a semaphore at some point along the track—for example, at station No. 4. The central-station operator depresses the button $a$, which lifts pin $b$ from the hole in which it is resting and moves the arm A of the selector in a right-hand direction around the face until it is over hole $S^4$ of the circular plate B. He then allows the pin $b$ to drop into the hole, and thereby lock the arm in that position. In swinging the arm around the toothed wheel C makes and breaks the circuit at the contact-springs $c$, so that a series of impulses of current are sent over the line from the battery B through switch-springs $c$, over line L, conductor $l$, magnet M, conductor $l^2$, magnet M' to ground. This energizes the magnets M and M' of all the substations, causing them to attract their armatures. Armature $m$ of magnet M moves the pawl $d$ and allows its curved end to ride down off pin $d'$. The prong of the pawl engages the teeth of the ratchet-wheel W and steps said ratchet-wheel at each substation a number of times equal to the number of impulses sent over the line. In this movement the pin $p$ on the disk D of station No. 4 will be carried far enough around to close the contact of the switch-springs $s$, but none of the pins at the other stations will close their contact, as they occupy different angular positions on the disk D. The teeth of the ratchet-wheel C and the arm A are relatively so arranged that whenever the arm is held in position over any of the holes S' $S^2$ $S^3$, &c., by the pins $b$ one of the teeth of the ratchet-wheel will be in position to press the contact-springs $c$ together to maintain the circuit closed. Thus the armature $m'$ of magnet M' remains attracted as long as the arm A remains locked at position $S^4$. The lip $f$, carried by the armature $m'$, is thereby held projected in the path of the lip $f'$ on the crank E. The operator now depresses the handle A' on the arm A, forcing the button $b'$ down, thereby causing the spring $b^2$ to make contact with the metallic segment $b^3$ of the inner ring B' on the face of the plate P. This completes circuit from battery B through conductor $x$, segment $b^3$, spring $b^2$, arm A, line L', conductor $l'$ $l^3$, contact $s$, conductor $l^4$, solenoid-magnet N, conductor $l^5$ to ground. The solenoid-magnet N becomes energized and draws up its core N'. The lip $f'$ engages the lip $f$ and locks the vane V in position to indicate "danger." The drawing up of the solenoid-core N' also causes crank E to break contacts $e$ and $e'$ and close contacts $e^2$ $e^3$. The contacts $e$ $e'$ when closed complete a circuit from a high-voltage trolley-line T through conductor $t$, resistance R, lamp O, contacts $e$ $e'$, resistance R' to ground. The closing of contacts $e^2$ $e^3$ transfers the normal ground through resistance R' to an auxiliary ground through resistance $R^2$ and conductor $l^5$.

Having set the signal, the operator desires to test and see if the apparatus has operated correctly. He therefore withdraws pin $b$ from hole $S^4$ and continues the revolution of the arm A around to its zero position. This again sends impulses over the line L to advance the step-by-step mechanisms at each station. If these steps do not miss and the signaling-station devices step around synchrouously with the selector-arm A when said arm reaches a position over $T^4$, the contact $s'$ at the signaling-station No. 4 will be closed by a pin $p'$ and at all the other sub-stations will be open. As arm A passes over $T^4$ the lug $g$ on its under side will engage plunger $g'$. In this position the contact-spring $c$ is open with the consequent deënergization of magnet M and closure of contacts $s^2$. As shown most clearly in Fig. 3, a test-current then comes from the signaling-station off a high-potential line T, conductor $t$, resistance R, lamp O, contacts $e^2$ $e^3$, lead $t'$, contacts $s^2$ and $s'$, conductors $l^3$ $l'$, back over line L' to the arm A of the selector through the button $g'$, spring $h$, magnet-winding $i$, to ground. The resistances R and $R^2$ have sufficiently reduced the current tapped off from the high-voltage line to permit its use in the local circuit of the selector. The energization of winding $i$ of the magnet I will cause it to draw up its armature I', closing the local circuit of the lamp $P^4$. This circuit may be traced from battery $B^2$, locking-winding $i'$, contact $j$, (which will be closed, the lug $g$ having by the continued revolution of arm A passed over the button $g'$,) lamp $P^4$, armature-contact I', and the magnet-frame, back to battery. The locking-winding $i'$ will thus maintain the local circuit closed and the lamp $P^4$ in a lighted condition until the contact $j$ is opened, as will be described hereinafter. The lighting of lamp $P^4$ indicates that signal No. 4 has been set.

Let us now consider a condition in which the step-by-step devices at the signaling-stations have not operated correctly, but have missed a step, and hence contact $s$ for station No. 3 is closed when the arm A is at position $S^4$ for station No. 4. The operator depresses handle A' and sends current from battery B over conductor $x$, ring $b^3$, spring $b^2$, arm A, line L', conductor $l'$ $l^3$, contact $s$ at station No. 3, conductor $l^4$ through the solenoid-magnet N to ground. This sets, of course, the signal at station 3, though the operator intends to set signal at station No. 4. The operator in testing continues to revolve the arm A around to test-button $T^4$, and as a result of the missed step in the setting of the signal the testing-contact $s'$ is closed at station No. 5. The arm A is over test-button $T^4$; but as the signal at No. 5 station is not set there is no current on the arm A, and consequently the lamp $B^4$ is not lighted. The operator would therefore be informed of the incorrect operaton of the system. This, as is apparent, is due to my improved arrangement of testing positions, since by my arrangement the test for station No. 4 is made before the arm A reaches the position $T^3$. Now the operation of lighting a test-signal lamp in the local circuit at the central station depends on current being on the arm of the selector before or at the time it reaches a test-button. If current is on the arm from any station at which a signal has been set, the next test-button the arm comes in contact with will cause the corresponding test-lamp to light. In my arrangement the test-button of the signal it is desired to set and which supposedly has been set is passed in the event of a step or steps having been missed before any current is on the arm, and hence the test-lamp of that signal cannot be lighted falsely.

It will be seen that the operator is unable to get a false test even if he sets a wrong signal and operates the signaling apparatus incorrectly. Furthermore, the signal-setting positions and the testing positions are such that the operator must first set his signal and then test, and having set his signal he advances naturally into the testing position. It is impossible to get connection to the outside high-voltage line unless the semaphore-signal has been set, and having been set the above-described test-circuit (shown in Fig 3) is established, and the lighting of any lamp P', $P^2$, &c., indicates that the signal has been set, that the lamp O has been lighted, and that the high-potential trolley-current is on the line. If any of the above conditions are not fulfilled, the lamps P' $P^2$ $P^3$, &c., are not lighted when the arm A passes over the buttons $g'$ at positions T' $T^2$ $T^3$, &c., respectively, which indicates that there is either no current on the trolley-wire T or that the lamp O is out or that the semaphore at the station tested has failed to operate.

The means for releasing the semaphore-signal, while not forming part of my invention, may be conveniently comprised in the system of which my invention forms a part and is fully described in the above-mentioned copending application of Frank R. McBerty.

The toothed wheel C is so constructed that just prior to the return of the arm A to zero position the contact-springs $c$ are closed, thus completing the above-described circuit from battery B through magnets M and M'. The magnet M thereupon attracts its armature $m$, which closes the contact $s^3$. Simultaneous with this the spring $b^2$ makes contact with a raised spot (not shown) on the segment $b^3$. Thereupon a circuit is closed ·from ground through battery B, conductor $x$, spring $b^2$, arm A, line L', conductor $l'$, contact $s^3$, conductor $l^6$, magnet $M^2$, conductor $l^7$ to ground, thus holding back ratchet $m^2$ and closing contact $s^4$. This short-circuits contact $s^3$ and maintains current in magnet $M^2$, when magnet M releases its armature and opens contact $s^3$.

As the arm A continues its revolution to the zero-point the contact-spring is again opened, thereby deënergizing magnet M. The armature $m$ being released, the curved end of the pawl $d$ rides upon the pin $d'$ and withdraws the pawl $d$ from engagement with the ratchet-wheel W. Said wheel and the disk D under the influence of a spring (not shown) return to their normal or zero positions with the pin $p^2$ resting on stop $p^3$, since both pawls $d$ and $m^2$ are withdrawn. The arm A has now returned to its normal or zero position. When the operator desires to release the semaphore, he again rotates the arm A to hole $S^4$, sending impulses over the line, and the pin $p$ closes contact $s$ at signal No. 4, the circuit being as heretofore described. The operator now raises the lever A', thereby depressing the plunger K, the insulated head K' of which forces out the switch-springs $k$ $k'$ to close their contacts. This closes a circuit from ground through battery B back over lines L and L'. That over line L may be traced as follows: from ground through battery B, conductor $x$, contact $k$, conductor $x'$, line L, conductor $l$, magnet M, conductor $l^2$, magnet M' to ground. The other circuit is traced from ground through battery B, conductor $x$, contact $k'$, conductor $x^2$, line L', conductor $l'$, contact $s$, conductor $l^4$, solenoid N, conductor $l^5$ to ground. The energization of solenoid M causes it to draw up its plunger sufficiently to raise the lip $f'$ out of engagement with the lip $f$, so that when magnet M' is deënergized the lip $f$ will be withdrawn out of the path of the lip $f'$, and the semaphore-arm will be free to drop to its normal position, when the solenoid N is deënergized. The arm A is now continued in its rotation; but as the springs $c$ are short-circuited at $k$ the selecting devices at the signal-boxes do not move, and hence the contact $s$ at signal No. 4 remains closed. As the arm approaches zero the lug $g$ depresses the button $g'$ and opens the lamp-circuit at contact $j$, releasing the armature I' of the magnet I, and as the test-circuit is open at $s'$ the armature remains unattracted and the lamp $P^4$ is extinguished. When near the zero position, the magnets M and M' release the selecting devices, which again return to their normal position, as hereinbefore described. The plunger K is now returned to its normal position, opening contacts $k$ and $k'$ and removing all current from the system, thereby deënergizing all the magnets. The solenoid N being deënergized and the lip $f$ being out of the path of the lip $f'$, as above described, the semaphore-arm drops to its normal position.

I claim—

1. In a selective signaling system, a selector having signal-setting positions and testing positions arranged in inverse order with relation to each other, whereby a partial movement of said device will give the positions for setting the signal and a subsequent continued movement will give, in inverse order, the positions for testing the same, substantially as described.

2. In a selective signaling system, the combination with signal-setting and signal-testing mechanism and circuits therefor, of a selector-frame having a series of signal-setting positions, a series of signal-testing positions following said setting positions and arranged in an inverse order with relation thereto, and an arm adapted to travel over said positions to operate said setting and testing mechanism.

3. In a selective signaling system, a selector-frame having a series of signal-setting positions concentrically arranged thereon, a series of concentrically-arranged signal-testing positions following in inverse order said setting positions, and a rotatable arm the partial movement of which will give in succession the positions for setting a signal and a subsequent continued movement will give in inverse order the positions for testing the same, substantially as described.

4. A selective signaling system comprising a central station and a plurality of substations, circuit connections between the same, a test-signal at the central station for each of the substations, a semaphore at each substation, a selector at the central station having a plurality of signal-setting positions corresponding to the substations, a plurality of testing positions following said setting positions in inverse order thereto, a selector-arm adapted to travel over said positions to set a semaphore and to test the operation thereof, a test-circuit adapted for connection to one of said substations by the operation of the semaphore at said station, and a local circuit at the central office adapted to be closed by current from the test-circuit to operate the test-signal only when the selector-arm is in the testing position corresponding to the substation at which a signal has been set.

5. The combination with a signaling system for selectively setting from a central station a signal at one of a plurality of substations, a selecting device and a signal-setting mechanism at each of the substations, a selector-frame at the central station having signal-setting positions concentrically arranged thereon, a series of concentrically-arranged signal-testing positions on said frame following in inverse order said signal-setting positions, a unidirectional rotating arm for sending impulses of current over a line to operate the selecting devices to select a substation, means on the selector-arm for applying current from a battery over a line to operate the signal-setting mechanism, a switch operated by the signal-setting mechanism to apply, through the coöperation of the selecting device, current from an external source to the selector-arm when said arm reaches a testing position corresponding to the substation at which a signal has been set, a test-signal in a local circuit, and a locking-relay operated by said current from the selector-arm and controlling the display of said test-signal.

In witness whereof I hereunto subscribe my name this 1st day of September, A. D. 1905.

CHARLES E. SCRIBNER.

Witnesses:
RAY T. ALLOWAY,
BERT STARR YORK.